Figure 1:
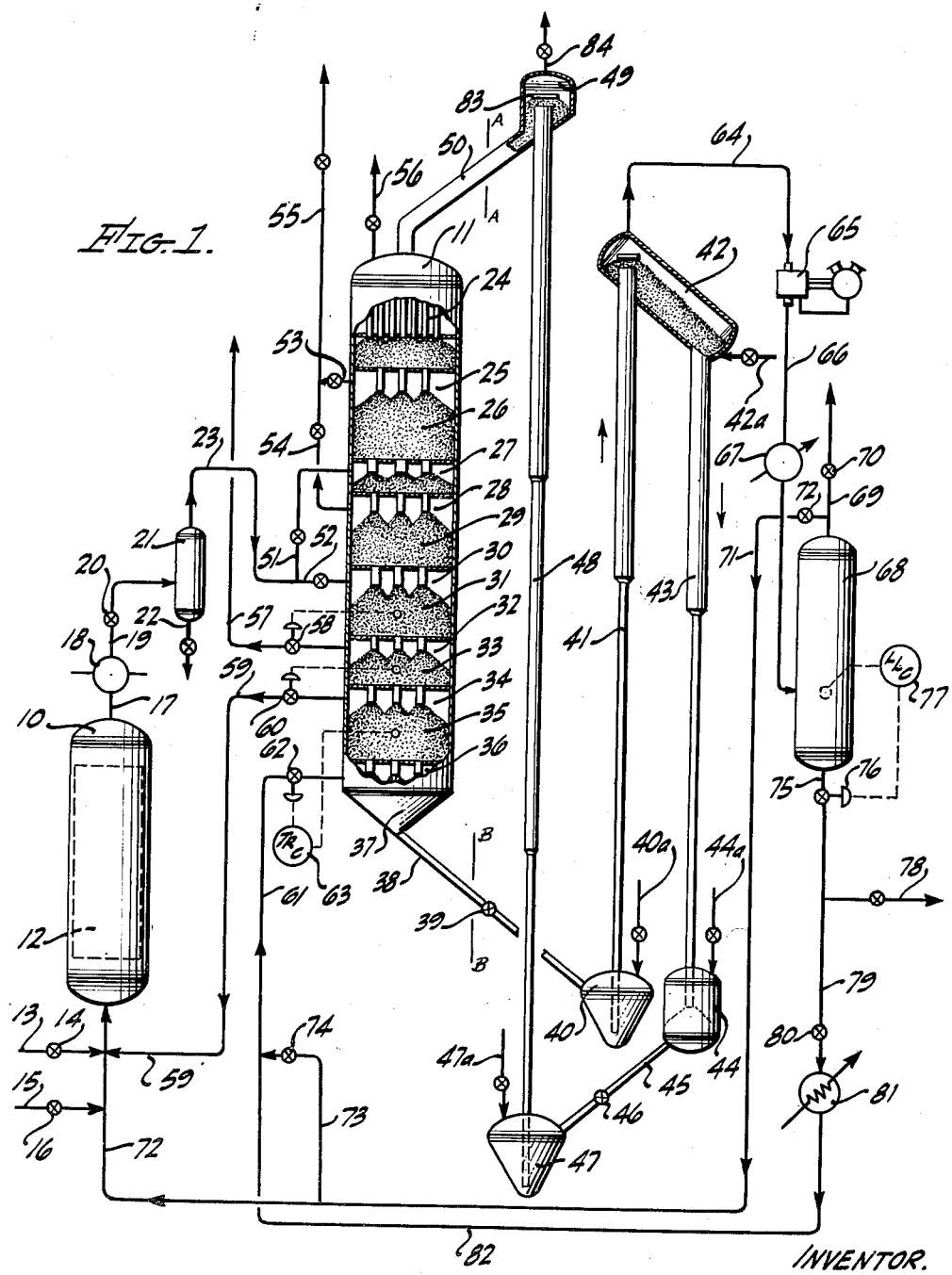

July 27, 1954

C. H. O. BERG 2,684,932

APPARATUS AND PROCESS FOR CONTACTING ADSORBENT
SOLIDS WITH FLUIDS THROUGH ZONES
OF DIFFERENT PRESSURES

Filed Feb. 17, 1950

2 Sheets-Sheet 1

INVENTOR.
CLYDE H. O. BERG,
BY
AGENT.

July 27, 1954
C. H. O. BERG
2,684,932
APPARATUS AND PROCESS FOR CONTACTING ADSORBENT
SOLIDS WITH FLUIDS THROUGH ZONES
OF DIFFERENT PRESSURES
Filed Feb. 17, 1950
2 Sheets-Sheet 2
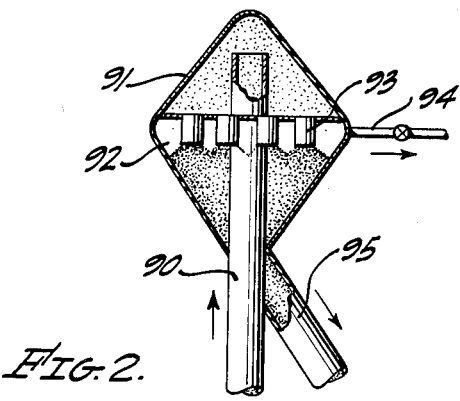
FIG. 2.
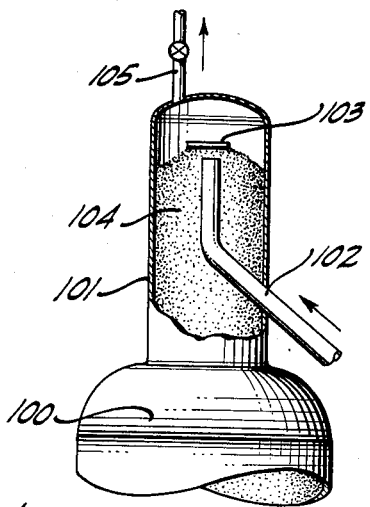
FIG. 3.
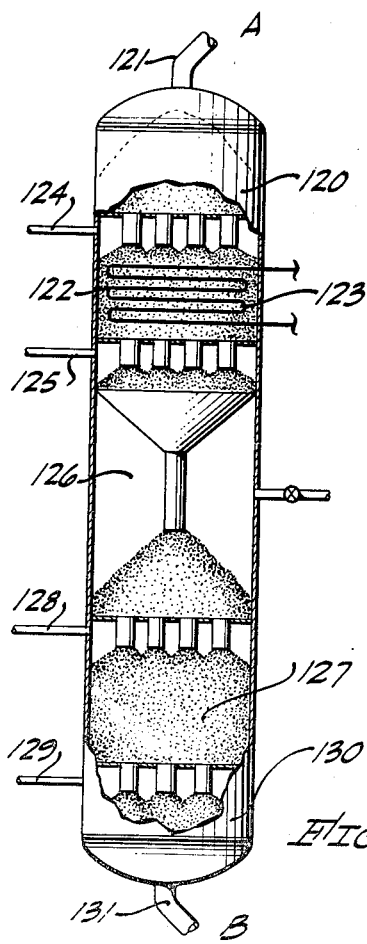
FIG. 5.
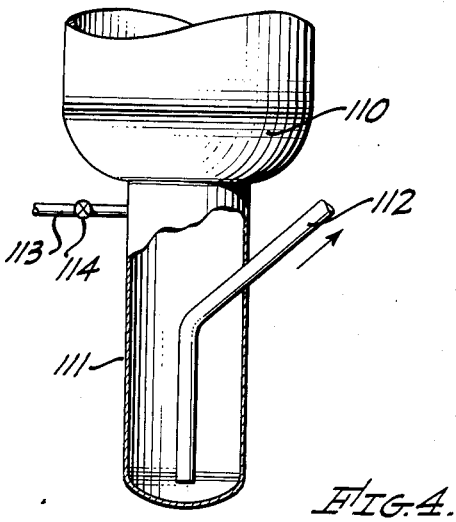
FIG. 4.
INVENTOR.
CLYDE H. O. BERG,
BY
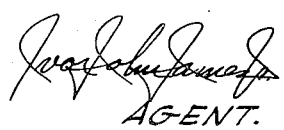
AGENT.

Patented July 27, 1954

2,684,932

UNITED STATES PATENT OFFICE 2,684,932

APPARATUS AND PROCESS FOR CONTACTING ADSORBENT SOLIDS WITH FLUIDS THROUGH ZONES OF DIFFERENT PRESSURES

Clyde H. O. Berg, Long Beach, Calif., assignor to Union Oil Company of California, Los Angeles, Calif., a corporation of California Application February 17, 1950, Serial No. 144,677

19 Claims. (Cl. 196—52)

This invention relates to improvements in processes involving the continuous contacting of fluids with moving streams of granular solids. In particular it relates to improved methods and apparatuses for treating a circulating stream of granular solids under conditions which include treatments at two substantially different pressures. Specifically one modification of this invention relates to a method and apparatus for the adsorption of gaseous mixtures on a moving bed of granular adsorbent and subsequently removing the adsorbed constituents at a reduced pressure.

In the process of continuous selective adsorption of gaseous mixtures on a solid granular adsorbent, the gaseous mixture is contacted under countercurrent conditions of flow with a moving bed of solid granular adsorbent. The more readily adsorbable constituents of the gaseous mixture are adsorbed leaving the less readily adsorbable constituents as a substantially unadsorbed lean gas which is removed from the process as a product stream. Under the usual conditions of operation the rich adsorbent is indirectly heated and contacted with the stripping gas whereby the adsorbed constituents are removed leaving a lean adsorbent. A portion of the thus desorbed constituents is used as reflux to rectify the rich adsorbent and to preferentially desorb any residual quantities of the less readily adsorbable constituents usually present. These more readily adsorbable constituents thus desorbed are all eventually removed as a rich gas product.

Certain gaseous mixture desirably separated by the continuous selective adsorption process contain more readily adsorbable constituents which are deleteriously effected by the conditions of stripping; for example, highly unsaturated hydrocarbons are prone to polymerize under such conditions resulting in a decreased adsorbent capacity for adsorption as well as a serious loss of a desirable product. Other gaseous mixtures are deleteriously effected by the presence of the stripping gas which is usually steam.

It is therefore an object of the present invention to provide an improvement in the selective adsorption process whereby such gaseous mixtures may be separated and the adsorbed constituents removed from the adsorbent by a low pressure treatment in the presence of a nonreactive stripping gas.

In the continuous processes for the catalytic treatment of fluids, which may be exemplified by the catalytic cracking of hydrocarbons, a spent carbonaceous catalyst containing residual hydrocarbons desirably recovered is discharged from the reaction zone. In the usual manner of treatment these hydrocarbons are removed from the catalyst by steam stripping. It has been shown, however, that steam has a deleterious effect upon cracking catalysts and the loss of activity thereof is tolerated since more intricate means for treating the catalyst is not warranted.

Other catalytic processes, such as for example the well known hydroforming process, involve a series of treating operations in which the catalyst is successively contacted with hydrocarbons to be reformed, a purge gas, an oxygen-containing regeneration gas, another purge gas followed by a hydrogen-containing reducing gas, and another purge gas. Such processes as this one also involve the removal of fluids from solids, an operation which is more conveniently carried out by a low pressure or vacuum treatment.

It is therefore another object of the present invention to provide an improved process and apparatus for the alternate high pressure and low pressure treatment of solids in continuous moving bed catalyst processes.

The primary object of the present invention is to provide an improved method and apparatus for processing a continuous recirculating solids stream under conditions involving separate steps at substantially different pressures.

A further object is to provide an improved process and apparatus for contacting solids with high pressure fluids and low pressure fluids in the same system, economically, efficiently, and in simple mechanical steps.

It is another object of this invention to provide an improved continuous selective adsorption process involving a low pressure stripping step.

A more specific object is to provide an improved process for catalytic oxidation of ethylene and the separation of ethylene oxide in a selective adsorption process utilizing low pressure stripping.

It is also an object to provide a simplified apparatus to accomplish the above-mentioned objects.

Other objects and advantages of the present invention will become apparent to those skilled in the art as the description thereof proceeds.

Briefly the present invention comprises an improvement in moving solids contact processes whereby a combination of solids conveyance conduits or lift lines and solids sealing legs or downcomers are operated through which the granular solids are moved in substantially compact form in the presence of a cocurrently or countercurrently depressuring fluid whereby the efficient movement of granular solids successively through zones of widely differing pressures is obtained. For example, the granular solids after contact with fluids at elevated pressures are depressured cocurrently with conveyance fluids through a conveyance zone to as low a pressure as desired in a subsequent treating zone which may be as low as the best commercially feasible vacuum pressures. Through these conveyance zones the solids are maintained in compact form, that is, at the same bulk density in pounds of solids per cubic foot of volume as the static bulk density of the solids when at rest. If a low pressure treatment is desirable the solids may be discharged into a vessel maintained at that pressure and through which treating fluids are passed. In some operations the low pressure treatment is conveniently effected in the conveyance zone while the solids are being removed from the high pressure zone to a low pressure zone. As an example of this latter modification, the stripping of residual fluids from granular solids in the presence of a stripping-conveyance fluid may be cited.

From the low pressure zone the solids are allowed to pass by gravity through a sealing leg zone or downcomer through which the solids are carried by gravity countercurrently to a depressuring fluid flow whereby the solids are returned to a higher pressure zone. From this point the solids may be introduced, if desired, directly into the high pressure system or may be conveyed through another conveyance zone to the top, for example, of a vessel or zone operated at a higher pressure.

Thus, a complete circulation of granular solids through zones of high and low pressure may be maintained under conditions in which the granular solids are always maintained in substantially compact form and are not aerated or fluidized or allowed to form suspensions of solids in fluids at any point in the depressuring or repressuring system.

It is to be understood, however, that in the high or low pressure system wherein the solids are contacted with the fluids to be treated, fluidized solids may exist, but the successful operation of the step of depressuring the solids to a low pressure and repressuring them to the high pressure of the treating system requires that the solids are maintained in compact form in the conveyance and sealing leg zones.

The essence therefore of the present invention lies in the conveyance of compact granular solids through a conveyance zone cocurrently with a depressuring conveyance fluid, discharging the solids into a low pressure zone from the conveyance zone, flowing the solids by gravity from the low pressure zone through a sealing leg zone to a higher pressure zone, and returning the solids discharging from the sealing leg zone to a higher pressure treating zone for recirculation therethrough. It is to be understood that the general operation of this invention is applicable with advantage to virtually any process involving a circulating stream of solids which are moved through zones of differing pressures. The advantages realized in any of these processes include a substantial decrease in the amount of energy required to transport the solids as well as a substantial decrease in the solids losses due to attrition and abrasion. The decrease in attrition loss of solids is mainly attributed to the fact that there are no moving mechanical parts involved in conveying the solids.

The process and apparatus of the present invention will be more clearly understood by reference to the accompanying drawings in which:

Figure 1 is a combination elevation view and process flow sheet for a continuous selective adsorption system for the separation of gaseous mixtures at an elevated pressure and the subsequent low pressure stripping of sensitive constituents of the gaseous mixture from the adsorbent, Figure 2 shows an elevation view in cross section of a portion of the conveyance apparatus by means of which the conveyance fluids and the conveyed solids are separated subsequent to conveyance, Figure 3 shows a modification of the conveyance fluid-solids separation device as it exists integrally with the upper portion of a treating vessel through which the solids are to be passed, Figure 4 shows an elevation view in cross section of a modification of the lower extremity of a vessel from which the solids are to be removed and conveyed according to this invention, and Figure 5 shows an elevation view in cross section of a vessel typical of catalytic treating processes and which may be substituted for the vessel in Figure 1.

Referring now more particularly to Figure 1, the description will be made of a typical selective adsorption process for the manufacture and recovery of ethylene oxide from the effluent gases of a catalytic ethylene oxidation reaction. In this process, catalytic reactor 10 and selective adsorption column 11 are provided to accomplish, respectively, the manufacture and the recovery of ethylene oxide. A silver catalyst 12 is employed in reactor 10 to contact the inlet gaseous mixture consisting primarily of fresh and recycle ethylene and air. Air is introduced via line 13 controlled by valve 14 and fresh ethylene is introduced by line 15 controlled by valve 16 together with recycle ethylene recovered from the effluent gases. A reaction is effected at a temperature which may be controlled between 350° F. and 750° F. The effluent gases contain nitrogen, unreacted oxygen, carbon monoxide, carbon dioxide, unreacted ethylene, ethylene oxide, and water vapor. These gases are removed from reactor 10 via line 17 and pass through heat interchanger 18 whereby the products are cooled and if desired the reactor feed gases may be preheated in this exchanger. The thus cooled gases subsequently pass via line 19 at a rate controlled by valve 20 into vapor-liquid separator 21 from which the condensate formed is removed via line 22 leaving a cooled ethylene oxide-containing gas. This gas comprises the feed gas to selective adsorption column 11 to which it is passed via line 23.

Selective adsorption column 11 is provided at successively lower levels therein with adsorbent cooling zone 24, first lean gas disengaging zone 25, first adsorption zone 26, first feed gas engaging zone 27, second gas disengaging zone 28, second lean gas adsorption zone 29, second feed gas engaging zone 30, first rectification zone 31, first side cut gas disengaging zone 32, second rectification zone 33, second side cut gas disengaging zone 34, third rectification zone 35, and reflux gas engaging zone 36. Solid adsorbent collecting in bottom zone 37 is conveyed via transfer line 38 controlled by valve 39 into first induction zone 40. The adsorbent is then depressured through conveyance zone 41 in substantially compact form into low pressure zone 42. Herein the adsorbent may be contacted by a low pressure treating or stripping gas introduced by line 42a, but usually the conveyance gas or sealing gas is sufficient in quantity. The solids then flow by gravity through sealing leg 43 into sealing gas introduction zone 44. From here the solid adsorbent flows by gravity through transfer line 45 at a rate controlled by valve 46 into second induction zone 47. From here the solids are then conveyed through second conveyance zone 48 into solids-conveyance fluid separator zone 49. The solids thus conveyed subsequently flow via transfer line 50 and are returned for circulation through selective adsorption column 11. Those items of equipment designated by the numbers 38 through 50 include the essential elements of the solids conveyance apparatus which permits the depressuring and repressuring of granular solids from a high pressure zone to a low pressure zone and from the low pressure zone back to the same or a different high pressure zone.

In the selective adsorption column 11, two adsorption zones are shown, namely, sections 26 and 29. A plurality of adsorption zones such as two or more and up to as many as six or eight are desirable in processing gaseous mixtures which contain relatively low percentages, such as less than about 10% by volume, of constituents to be adsorbed by the adsorbent. Thus the feed gas is divided into a plurality of streams each of which is passed separately through an individual adsorption zone. The effect of this is to reduce substantially the diameter of the column required to treat a given volume of gases. To prevent feed gas from passing from one engaging zone to the lean gas disengaging zone adjacent below, the depending tubes from the transverse plates which form the engaging and disengaging zone in column 11 are made in different diameters, that is, the depending tubes from the lean gas disengaging zones are substantially smaller in diameter than the depending tubes in the feed gas engaging zone. Thus the pressure drop of gas flowing downwardly from a feed gas engaging zone through the tubes of the next lower lean gas disengaging zone is substantially greater than the pressure drop of gas flow from the feed gas engaging zone through the next higher adsorption zone. In Figure 1, one continuous stream of adsorbent passes successively down through all of the plurality of adsorption zones.

It is to be understood, however, that a preferred modification exists in which the adsorbent leaving cooling zone 24 is divided into a plurality of separate streams, one each of which is separately introduced into each of the plurality of adsorption zones the individual streams are separately removed from the plurality of adsorption zones, and combined for introduction into first rectification zone 31.

The effluent gaseous mixture from separator 21 is divided into two streams, one passing via line 51 into first adsorption zone 26 and the second via line 52 into second adsorption zone 29. The carbon dioxide, ethylene and ethylene oxide together with traces of water vapor, if present, are adsorbed forming a rich adsorbent and the nitrogen, carbon monoxide, and unreacted oxygen remain unadsorbed as a lean gas. This lean gas is removed from lean gas disengaging zones 25 and 28 by means of lines 53 and 54, respectively, and is sent to storage or further processing facilities not shown via line 55. At least a portion of this lean gas is allowed to pass upwardly from disengaging zone 25 through the tubes of cooler 24 countercurrent to the downwardly flowing adsorbent whereby the adsorbent is saturated with constituents of the lean gas product and traces of more readily adsorbable constituents are stripped therefrom. This gas is removed from the upper portion of column 11 via line 56.

The rich adsorbent passes into first rectification zone 31 wherein it contacts a reflux stream of carbon dioxide thereby desorbing traces of nitrogen, carbon monoxide and unreacted oxygen from the adsorbent forming a first rectified adsorbent. This adsorbent passes into second rectification zone 33 wherein it is contacted by a countercurrent flow of ethylene reflux thereby preferentially desorbing carbon dioxide leaving a second rectified adsorbent. The thus desorbed carbon dioxide is partly employed as reflux in first rectification zone 31 and the remainder is removed via line 57 as a first side cut gas product controlled by valve 58 and is sent to further processing facilities or storage not shown. In third rectification zone 35 the adsorbent is contacted with a countercurrent flow of ethylene oxide reflux introduced via line 61 at a rate controlled by valve 62 in accordance with temperature recorder controller 63 whereby ethylene is preferentially desorbed from the adsorbent leaving a third rectified adsorbent. The thus desorbed ethylene is partly employed as reflux in zone 33 while the remainder is removed via line 59 at a rate controlled by valve 60 as a second side cut gas product. Preferably this recovered ethylene is returned via line 59 and recirculated through reactor 12 for further conversion.

The third rectified adsorbent is saturated with ethylene oxide and substantially free from less readily adsorbable constituents.

The rich adsorbent then passes via transfer line 38 at a rate controlled by valve 39 into first induction zone 40. The adsorbent is then depressured with a cocurrent flow of ethylene oxide, or a portion of the lean gas product, or a separate inert gas introduced via line 40a as a lifting fluid. The solids pass upwardly through conveyance zone 41 with a cocurrent flow of a conveyance-stripping gas which depressures therethrough to any predetermined desired low pressure in vessel 42. During this conveyance a substantial proportion of the adsorbed ethylene oxide is desorbed from the adsorbent and the desorbed gases and the conveyed adsorbent are separated in vessel 42. The adsorbent subsequently flows downwardly through sealing leg 43 countercurrent to a flow of depressuring ethylene, or a portion of the lean gas product, or an inert gas introduced via line 44a as a sealing gas whereby further low pressure countercurrent stripping is effected. This gas is depressured upwardly through sealing leg 43 into vessel 42. The gases thus separated from the adsorbent therein are removed from vessel 42 via line 64. The predetermined low pressure is maintained by vacuum pump 65 or any similar device such as a jet ejector or a barometric leg. These gases contain stripped ethylene oxide together with the stripping and sealing gases. Preferably the lifting gas in conveyance zone 41, when ethylene oxide is not employed, is the same gas that is employed for sealing in sealing leg zone 43 since it considerably simplifies the problem of subsequent separation. These gases are then passed via line 66 through cooler 67 wherein ethylene oxide is condensed under pressure and the mixture passes to vapor liquid separator 68 wherein condensed ethylene oxide is separated from the noncondensable lift and sealing gases.

When an inert gas or a portion of the lean gas is employed for lifting and/or sealing in zone 41 and 43 the non-condensable gases are removed from separator 68 via line 69 at a rate controlled by valve 70 and may be discharged from the process or recirculated to the feed gas to recover residual traces of ethylene oxide. When ethylene and/or ethylene oxide are used for lifting and ethylene is used for sealing, the noncondensable gases are removed from separator 68 via line 71 at a rate controlled by valve 72 and are recirculated in one of two ways. First, the ethylene may be conveyed via line 71 and line 72 for recirculation and reconversion in reactor 12, or second, it may be at least partially passed via line 73 controlled by valve 74 and through line 61 as reflux to selective adsorption column 11. In the latter instance the ethylene oxide condensed in separator 68 is removed therefrom via line 75 at a rate controlled by valve 76 by liquid level controller 77 and is removed from the system as a liquid product via line 78. Preferably, however, at least a portion of the ethylene oxide product passes via line 79 controlled by valve 80 through vaporizer 81 and lines 82 and 61 as reflux to the third rectification zone of the selective adsorption column. This is the preferred form of reflux in that rectification zone.

The stripped adsorbent collecting in sealing gas inlet zone 44 flows by gravity into second induction zone 47 into which a lifting fluid such as an inert gas or preferably a portion of the lean gas product is introduced via line 47a. The stripped solids are depressured upwardly through conveyance zone or lift line conduit 48 in substantially compact form as a continuous moving bed cocurrently with the depressuring lifting fluid. The lifting fluid and the conveyed adsorbent are discharged into separator zone 49 against thrust plate 83 which serves to maintain the solids in zone 48 in substantially compact form. All or a portion of the conveyance fluid is removed therefrom via line 84 and the conveyed solids pass via transfer line 58 into the upper portion of selective adsorption column 11.

A circulation of solid granular adsorbent is hereby maintained successively through a high pressure adsorption zone and a vacuum stripping zone whereby the sensitive more readily adsorbable constituents are adsorbed from a gaseous mixture on an adsorbent and subsequently stripped from the adsorbent in the vacuum stripping zone. If desired, a small degree of heat may be introduced into the rich adsorbent in bottom zone 37 of selective adsorption zone 11, or while the solids are being transferred through conveyance zone 41 to assist the vacuum desorption with ethylene oxide. The degree of heating the adsorbent preferably does not exceed about 250° F.

Conveyance zone 48, depressuring and stripping zone 41 and sealing leg zone 43 are depicted as segmented conduits having successively larger diameters in the direction of fluid flow. The purpose of these sections of different diameter is to maintain the fluid velocity through the individual zones within predetermined limits so that the fluid pressure differential per unit length of lift line remains within fairly narrow limits. This permits in zones 41 and 48 the uniform application of lifting force to all portions of the solids contained therein and prevents the generation of appreciably higher lifting forces in the uppermost parts of each section than exist in the lower parts.

Preferably the solid adsorbent comprises activated charcoal although other well-known solid adsorbents such as activated aluminum oxide, silica gel, and the like may be employed in granules having a mesh size of from about 5 to 100 or higher, and preferably from about 10 to 40.

Referring now more particularly to Figure 2 a modification of separator zone 49 is shown in which lift line 90 introduces solids with a cocurrent lift gas flow into separator 91. The physical shape of the separator is that of a double cone with lift line 90 extending through the lower apex and opening into the upper cone adjacent its apex. No thrust plate is required and the granular solids flow downwardly through lift gas disengaging zone 92 situated in the general area corresponding to the coincident bases of the cones. At this point there is sufficient lifting fluid disengaging area on the granular solid surfaces formed from the solids discharging from depending tubes 93 so as to prevent the suspension of the solids in the fluid. The lifting fluid is removed via line 94 and the solids flow downwardly into the lower cone to be removed therefrom via transfer line 95. This modification of separator zone may replace, if desired, the separator zone 59 shown in Figure 1.

Referring now more particularly to Figure 3 another modification of separator zone is shown which is particularly well adapted to installations in which the separator zone is an integral part of the upper portion of a treating vessel. Thus vessel 100 is provided with separator zone 101 into which lift line 102 extends to open adjacent the upper extremity thereof. Thrust plate 103 is provided to maintain solids in line 102 in substantially compact form. The mass of solids 104 discharging from line 102 passes downwardly into vessel 100 while lifting fluid separated therefrom is removed via line 105. This modification of separator zone may also be installed in the apparatus illustrated in Figure 1.

Referring now more particularly to Figure 4 a modification of induction zone is shown which is adaptable to installation as an integral part of the lower portion of a treating vessel from which solids are to be removed. Vessel 110 is provided with a depending induction zone 111 into which lift line 112 opens at a point adjacent the lower extremity of the induction zone. If desired, the lower extremity of the lift line, as is true with the other induction zones 40 and 47 shown in Figure 1, may be restricted by a means not shown to between 0.1 and about 0.5 of the cross sectional area of the lift line. Lifting fluid may be introduced via line 113 controlled by valve 114, or it may consist of fluid already present in vessel 110 and which are allowed to depressure cocurrently with the solids therefrom through lift line 112. The induction zone shown in Figure 4 may replace the induction zones shown in Figure 1.

Referring now more particularly to Figure 5, an elevation view of a vessel suitable for carrying out catalytic reactions and catalyst regeneration is shown. In vessel 120 solids are introduced via transfer line 121 to flow downwardly through regeneration zone 122 which is provided with cooling coils 123 to remove the heat of regeneration. Regeneration gases are introduced and removed via lines 124 and 125. The regenerated catalyst passes downwardly through sealing zone 126 ultimately into reaction zone 127. The hot solids are contacted by fluids to be treated, introduced and removed via lines 128 and 129. The spent solids collect in bottom zone 130 and are removed therefrom via transfer line 131. In this type of vessel catalytic reactions such as hydrocarbon cracking and reforming, carbon monoxide hydrogenation as well as other catalytic reactions may be carried out. Furthermore such reactions as thermal coking and cracking may be carried out in such a vessel. In most of these cases the solids following the reaction step are in a condition which require some sort of purging or stripping which advantageously may be carried out at a decreased pressure from that existing in vessel 120. Further, the vessel shown in Figure 5 may bodily replace selective adsorption column 11 shown in Figure 1, the upper and lower portions of the vessel shown in Figure 5 being connected to transfer lines 59 and 38 respectively at points A—A and B—B. With such a combination the spent solids are depressured through a purging and stripping zone to a low pressure vessel, wherein they may be further treated if desired, and are subsequently returned through a sealing leg and another conveyance zone to the high pressure system shown in Figure 1.

The following data are given as examples of the process and apparatus of the present invention:

EXAMPLE I

An apparatus for selective adsorption of a gaseous mixture similar to that shown in Figure 1 was used for the recovery of ethylene oxide and ethylene from a gas produced from the catalytic oxidation of ethylene over a silver catalyst. This gaseous mixture was available at a rate of 141 M s. c. f. per hour and had the following composition:

Table 1
FEED GAS COMPOSITION

| Component: | Per cent by volume |
|---|---|
| Nitrogen | 76.6 |
| Oxygen | 10.3 |
| Water vapor | 1.3 |
| Carbon dioxide | 6.2 |
| Ethylene | 2.0 |
| Ethylene oxide | 3.3 |
| | 99.7 |

The selective adsorption column employed to separate this gaseous mixture was 11.0 feet in diameter, 130 feet in height and was provided with a circulation of 37 tons per hour of activated coconut charcoal as the adsorbent. The feed gas was introduced into the adsorber at a pressure of 60 pounds per square inch gauge.

A lean gas product was produced at a rate of 126 M s. c. f. per hour having the following composition:

Table 2
LEAN GAS COMPOSITION

| Component: | Per cent by volume |
|---|---|
| Nitrogen | 85.7 |
| Oxygen | 11.7 |
| Carbon dioxide | 2.6 |
| Ethylene | Trace |
| | 100.0 |

About 75 M s. c. f. per hour of this was removed from the top of the vessel after having passed through the tubes of the cooler as a purge gas.

The first side cut gas product containing mostly carbon dioxide was produced from the second rectification zone at a rate of 5.5 M s. c. f. per hour having the following composition:

Table 3
FIRST SIDE CUT GAS COMPOSITION

| Component: | Per cent by volume |
|---|---|
| Carbon dioxide | 96.4 |
| Ethylene | 3.5 |
| Ethylene oxide | 0.1 |
| | 100.0 |

A second side cut gas product was produced from the third rectification zone containing mostly ethylene at a rate of 2.9 M s. c. f. per hour and had the following composition:

Table 4
SECOND SIDE CUT GAS COMPOSITION

| Component: | Per cent by volume |
|---|---|
| Carbon dioxide | 3.4 |
| Ethylene | 93.2 |
| Ethylene oxide | 3.4 |
| | 100.0 |

The ethylene oxide product was stripped from the charcoal by means of a portion of the lean gas passed as lift gas and sealing gas through zones 41 and 43 respectively. This product was produced at a rate of 4.7 M s. c. f. per hour and had the following composition:

Table 5
ETHYLENE OXIDE PRODUCT COMPOSITION

| Component: | Per cent by volume |
|---|---|
| Ethylene | 2.2 |
| Ethylene oxide | 97.8 |
| | 100.0 |

In depressuring the rich charcoal through the first conveyance lift line, lean gas was depressured therethrough from a pressure of 60 pounds per square inch to a pressure of −13.5 pounds per square inch gauge maintained with the aid of a vacuum pump. The charcoal passed downwardly through sealing leg 43 countercurrent to sealing gas depressuring from five pounds per square inch gauge to −13.5 pounds per square inch gauge. The stripped charcoal was then repressured to the selective adsorption column through the main conveyance line 48 by means of a portion of the lean gas depressuring from 140 pounds per square inch gauge to the vessel pressure of 60 pounds per square inch gauge.

EXAMPLE II

In an apparatus similar to that described in connection with Figure 5, the catalytic cracking of 400° F. to 760° F. straight run gas oil was effected at a pressure of 25 pounds per square inch gauge, at a temperature which varied between 870° F. and 925° F. with an oil-to-catalyst ratio of 0.4 by volume in the presence of an acid treated natural clay. The spent catalyst from the reactor was contaminated with 3.5% coke. This spent catalyst was depressured through a conveyance-stripping zone from 20 pounds per square inch to minus 12 pounds per square inch gauge in the presence of a cocurrent of cracked dry gas consisting mainly of methane and hydrogen. A substantially complete removal of residual hydrocarbon contained on the hot spent catalyst was obtained. The stripped spent catalyst was subsequently passed from the vacuum chamber down through a sealing leg countercurrent to another flow of dry gas as a sealing fluid. The pressure at the bottom of the sealing leg was approximately atmospheric. The vacuum stripped catalyst was subsequently pressured through a lift line using hydrocarbon dry gas as a lifting medium depressuring from 55 pounds per square inch gauge to the reaction pressure of 20 pounds. The thus conveyed catalyst was then passed through the regeneration zone wherein the 3.5% coke was burned at a temperature of below 1050° F. leaving a hot regenerated catalyst to contact further quantities of the hydrocarbon feed. A 37% conversion to 400° F. end point gasoline was obtained. A jet ejector was used to maintain −10 pounds per square inch gauge pressure on the vacuum zone and a noticeably increased catalyst activity was maintained by virtue of the fact that dry gas instead of steam was employed at low pressure to strip the catalyst.

It is to be understood that the foregoing examples are merely illustrative of the process and apparatus of the present invention and are not to be considered as limitations thereon. The method and equipment described for the treatment of moving masses of granular solids in systems involving two substantially different operating pressures are applicable to a wide variety of solids besides granular adsorbents and cracking catalysts shown in the examples. Furthermore, the particular adsorption example relating to the recovery of ethylene and ethylene oxide is also not to be considered as limiting the adsorption process combination since it is also applicable to the separation of other gaseous mixtures in which at least one of the constituents is highly soluble in water, reacts as water or water vapor, is corrosive in water or water vapor, or is thermally sensitive as are the easily polymerizable substances.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A process for continuously recirculating granular solids successively through contacting zones of substantially different pressures which comprises contacting said solids in a first contacting zone with the higher pressure fluid, passing said solids from said first contacting zone to a first induction zone, introducing a first conveyance fluid thereinto under a relatively high pressure, depressuring a flow of said conveyance fluid therefrom through an elongated first conveyance zone from said relatively high pressure to a relatively low pressure concurrently with and at a rate sufficient to convey said solids, maintaining said solids in said first conveyance zone at a bulk density substantially equal to the static bulk density of said solids when at rest thereby permitting the maintenance of substantial pressure differentials between the inlet and outlet thereof, flowing conveyed solids from said conveyance zone outlet at said relatively low pressure into a second contacting zone, contacting said solids therein with a relatively low pressure fluid, flowing said solids by gravity as a downwardly moving bed from said second contacting zone through a sealing zone, introducing a sealing fluid at a relatively high pressure into a seal fluid engaging zone in solids-receiving relation to said sealing zone thereby depressuring a countercurrent flow of sealing fluid from a relatively high pressure to said relatively low pressure therethrough at a rate insufficient to stop the solids flow, flowing said solids from said sealing zone into a second induction zone, introducing a second conveyance fluid thereinto at a high pressure greater than said relatively high pressure, depressuring a flow of said conveyance fluid therefrom through an elongated second conveyance zone from said high pressure to said relatively high pressure concurrently with and at a rate sufficient to convey said solids, maintaining said solids in said second conveyance zone at a bulk density substantially equal to the static bulk density of said solids when at rest, and discharging said solids therefrom substantially at said relatively high pressure into said first contacting zone for repassage therethrough.

2. A process according to claim 1 wherein said solids comprise a granular hydrocarbon conversion catalyst, said first contacting zone contains a catalyst regeneration zone, a sealing zone and a hydrocarbon conversion zone, said catalyst is passed as a downwardly moving bed successively through said zones, and said second contacting zone comprises a low pressure spent catalyst stripping zone.

3. In a process for the separation of gaseous mixtures by selective adsorption which comprises contacting a gaseous mixture with a moving bed of solid granular adsorbent forming a rich adsorbent containing more readily adsorbable constituents leaving less readily absorbable constituents substantially unadsorbed, and subsequently recovering adsorbed constituents from said rich adsorbent, the improvement which comprises recovering the adsorbed consittuents by the combination of steps of passing the rich adsorbent into a conveyance zone, maintaining said rich adsorbent therein substantially at its static bulk density by applying a thrust force against the mass of adsorbent discharging from said conveyance zone, conveying said rich adsorbent therethrough concurrently with a depressuring conveyance gas into a low pressure zone thereby partially stripping said adsorbent, flowing said partially stripped adsorbent therefrom by gravity through a sealing zone, countercurrently contacting said partially stripped adsorbent therein with a sealing gas to further strip said adsorbent, maintaining solids in said sealing zone in substantially compact form, collecting the conveyance gas and the sealing gas and the stripped more readily adsorbable constituents in said low pressure zone, removing the gaseous mixture thus formed from said low pressure zone, and returning the adsorbent to contact further quantities of said gaseous mixture.

4. A process according to claim 3 wherein said solid granular adsorbent comprises activated charcoal.

5. A process according to claim 3 wherein said more readily adsorbable constituents in said gaseous mixture are selected from the group consisting of gaseous constituents adversely affected by water and those which are thermally sensitive.

6. An apparatus for movement of granular adsorbent solids through stages of treatment with fluids of substantially differing pressures which comprises in combination a selective adsorption column provided with a solid adsorbent cooling section, at least one adsorption section, inlet means for fluids thereto, outlet means for fluids therefrom, and at least one rectification section, said column being adapted to the downward flow of solids therethrough, an induction chamber in solids-receiving relation at its upper end to said adsorption column, a second treating vessel, a lift line conduit having its lower end opening into the lower portion of and adapted to be submerged in solids in said induction chamber and its outlet opening communicating with said second treating vessel, means at the outlet opening of said lift line conduit for applying a thrust force to solids discharging therefrom to maintain the solids therein at a bulk density substantially equal to the static bulk density of said solids when at rest, a sealing leg conduit depending from said second treating vessel, a sealing fluid engaging chamber communicating with the lower extremity of said sealing leg conduit, inlet conduit means opening into the upper part of said induction chamber for a conveyance fluid, means for controlling the flow of conveyance fluid through said lift line conduit, inlet conduit means for a sealing fluid opening into said engaging chamber, outlet conduit means from said second treating vessel for removing said fluid after contact with said solids, means for separating constituents desorbed from the solids in said lift line and sealing leg conduits from fluids removed from said second treating vessel, means for returning a portion of said desorbed constituents as reflux to said rectification section, and means for returning solids from said engaging chamber to said selective adsorption column.

7. An apparatus according to claim 6 in combination with a catalytic reactor, means for passing effluent gases therefrom to said adsorption section, inlet means for introducing reactant gases into said reactor, outlet means opening from said rectification section for removing unreacted reactant gases separated by said adsorbent from said effluent gases, and means for recirculating said unreacted gas to said reactor.

8. A process for contacting a stream of granular solids with fluids of different pressures in separate stages which comprises contacting said solids in a first contacting zone with the higher pressure fluid, passing said solids from said first contacting zone to a conveyance zone, depressuring a flow of conveyance fluid therethrough from said relatively high pressure to a relatively low pressure concurrently with and at a rate sufficient to convey said solids, maintaining said solids in said conveyance zone at a bulk density substantially equal to the static bulk density of said solids when at rest thereby permitting the maintenance of substantial pressure differentials between the inlet and outlet thereof, flowing conveyed solids from said conveyance zone outlet at said relatively low pressure into a second contacting zone, contacting said solids therein with a relatively low pressure fluid, flowing said solids by gravity as a compact downwardly moving bed from said second contacting zone through a sealing zone, depressuring a countercurrent flow of sealing fluid from a relaitvely high pressure to said relatively low pressure therethrough at a rate insufficient to stop the solids flow, and discharging solids from said sealing zone at a relatively high pressure.

9. A process according to claim 8 wherein said first contacting zone is a catalytic hydrocarbon conversion zone, said granular solids introduced into said conveyance zone consist of spent hydrocarbonaceous catalyst, and said relatively low pressure fluids introduced into said second contacting zone consist of a catalyst stripping fluid, said process being adapted to the relatively high pressure contacting of said catalyst with hydrocarbons and substantially complete stripping of residual hydrocarbons from said spent catalyst at said relatively low pressure.

10. A process according to claim 8 wherein said first contacting zone contains an adsorption zone, said granular solids introduced into said conveyance zone consist of granular adsorbent particles saturated at said relatively high pressure with adsorbed fluids, said relatively low pressure fluid consists of an adsorbent stripping agent, said process being adapted to the relatively high pressure adsorption of fluids on granular adsorbent solids in said first contacting zone and the substantially complete desorption of adsorbed constituents at said relatively low pressure in said second contacting zone.

11. A process for contacting a stream of granular solids with fluids of different pressures in separate stages which comprises contacting said solids in a contacting zone with the higher pressure fluid, passing said solids from said contacting zone to a conveyance zone, maintaining said solids in said conveyance zone substantially at their static bulk density by applying a thrust force against the solids mass discharging therefrom, cocurrently depressuring a conveyance fluid through said conveyance zone thereby moving said solids upwardly therethrough, discharging said solids and conveyance fluid into a low pressure zone, maintaining a low pressure therein by removing fluids therefrom, contacting said solids therein with a low pressure fluid, flowing said solids by gravity from said low pressure zone into a sealing zone, maintaining said solids in compact form therein, depressuring a flow of sealing fluid through said sealing zone countercurrent to the solids flow, and removing solids from said sealing zone.

12. A process according to claim 11 wherein said conveyance and sealing fluids are gaseous.

13. A process according to claim 11 wherein said solids comprise spent hydrocarbon-containing carbonaceous granules.

14. A process according to claim 11 wherein said solids removed from said contacting zone comprise activated granular adsorbent saturated with adsorbed fluids.

15. A process for contacting a stream of granular solids with fluids of different pressures in separate stages which comprises contacting said solids in a first contacting zone with the higher pressure fluid, passing said solids from said first contacting zone to an induction zone, introducing a relatively high pressure conveyance fluid thereinto, depressuring said conveyance fluid therefrom through an elongated conveyance zone communicating therewith from said relatively high pressure to a relatively low pressure concurrently with and at a rate sufficient to convey said solids, maintaining said solids in said conveyance zone at a bulk density substantially equal to the static bulk density of said solids when at rest thereby permitting the maintenance of substantial pressure differentials between the inlet and outlet thereof, flowing conveyed solids from said conveyance zone outlet at said relatively low pressure into a second contacting zone, contacting said solids therein with a relatively low pressure fluid, flowing said solids by gravity as a downwardly moving bed from said second contacting zone through a sealing zone into a sealing fluid engaging zone, introducing a sealing fluid thereinto at a relatively high pressure thereby depressuring said sealing fluid from said relatively high pressure through said sealing zone countercurrent to the flow of said moving bed of solids therein to said relatively low pressure, controlling the rate of said sealing fluid flow to a value insufficient to stop the solids flow, and discharging solids from said engaging zone at a relatively high pressure.

16. A method for recovery of adsorbed fluids from solid granular adsorbent materials saturated therewith which comprises introducing fluid-saturated adsorbent solids into an elongated conveyance-desorption zone, flowing a conveyance fluid through said zone at a rate sufficient to convey said solids therethrough concurrently with said fluid from the inlet to the outlet of said zone, applying a force against the adsorbent solids discharging from said zone to prevent fluidization of said solids therein and to maintain said solids therein at a bulk density substantially equal to the static bulk density of the solids when at rest whereby the flow of said conveyance fluid therethrough establishes and maintains a substantial pressure differential between the inlet and the outlet of said zone and moves said solids therethrough from a relatively high pressure at said inlet to a relatively low pressure at said outlet and whereby a substantial portion of said adsorbed fluids are desorbed from said adsorbent solids due to the reduction in pressure and the presence of said conveyance fluid while passing through said conveyance zone, separating the fluids and said adsorbent solids at said relatively low pressure after passage through said conveyance-desorption zone, and treating said fluids thus separated from said adsorbent solids to separate the desorbed fluid from said conveyance fluid.

17. A method according to claim 16 in combination with the steps of passing said adsorbent solids discharged from said outlet, after separation of said fluids, downwardly by gravity as a moving bed through a sealing leg zone from the solids inlet to the solids outlet thereof, passing a sealing fluid upwardly through said sealing zone countercurrent to the downwardly moving bed of adsorbent solids thereby establishing and maintaining at the solids outlet of said sealing zone a pressure relatively higher than that at the solids inlet of said sealing zone whereby said adsorbent solids, after passage from a high pressure through said conveyance and desorption zone to a relatively low pressure to desorb adsorbed fluids therefrom, are returned to a relatively high pressure by passage through said sealing leg zone.

18. A method for moving solids through systems of different pressure which comprises establishing a conveyance zone, a low pressure zone and a sealing zone, flowing a conveyance fluid concurrently with and at a rate sufficient to move a compact mass of granular solids through said conveyance zone into said low pressure zone, applying a thrust force against the solids discharging from said conveyance zone to maintain solids moving therethrough at a bulk density substantially equal to the static bulk density of said solids when at rest, then flowing said solids as a downwardly moving bed by gravity through said sealing leg zone, passing a sealing fluid countercurrent to said moving bed of solids in said sealing zone, and removing said conveyance fluid and said sealing fluid from said low pressure zone.

19. A method for continuously moving granular solids from a high pressure into a low pressure zone and from said zone back to a relatively high pressure which comprises introducing said solids into a conveyance zone, passing a conveyance fluid therethrough at a rate sufficient to convey said solids, applying a thrust force against the solids discharging therefrom to maintain said solids throughout said conveyance zone at a bulk density substantially equal to the static bulk density of said solids what at rest, passing said solids from said low pressure zone downwardly by gravity as a moving bed through a sealing zone, passing a countercurrent flow of sealing fluid through said sealing zone, and removing said sealing and conveyance fluids from said low pressure zone thereby establishing and maintaining a pressure therein which is substantially less than the pressures existing at the inlet of said conveyance zone and the solids outlet of said sealing zone.

References Cited in the file of this patent

UNITED STATES PATENTS

| Number | Name | Date |
|---|---|---|
| 727,030 | Tieghman | May 5, 1903 |
| 1,825,707 | Wagner, Jr. | Oct. 6, 1931 |
| 1,901,932 | Schaub | Mar. 21, 1933 |
| 2,304,827 | Jewell | Dec. 15, 1942 |
| 2,311,564 | Munday | Feb. 16, 1943 |
| 2,407,700 | Huff | Sept. 17, 1946 |
| 2,411,996 | Kassel | Dec. 3, 1946 |
| 2,413,479 | Wiegand | Dec. 31, 1946 |
| 2,414,373 | Gerhold | Jan. 14, 1947 |
| 2,429,359 | Kassel | Oct. 21, 1947 |
| 2,463,623 | Huff | Mar. 8, 1949 |
| 2,561,409 | Ardern | July 24, 1951 |